ns process.

United States Patent Office 3,384,670
Patented May 21, 1968

3,384,670
THIOETHER ETHERS
Walter Reifschneider, Midland, Mich., assignor to The Dow Chemical Company, Midland, Mich., a corporation of Delaware
No Drawing. Continuation-in-part of applications Ser. No. 205,503, June 27, 1962, and Ser. No. 359,763, Apr. 14, 1964, which latter application is a continuation-in-part of application Ser. No. 205,512, June 27, 1962. This application Oct. 6, 1966, Ser. No. 584,691
9 Claims. (Cl. 260—609)

ABSTRACT OF THE DISCLOSURE

Compounds of the formula

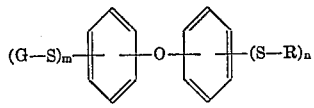

wherein R and G independently represent alkyl from 2 to 12, inclusive, carbon atoms, cyclopentyl or cyclohexyl; and $n$ is 1 to 4, and $m$ is 0 to 4; useful as pesticides, intermediates in the preparation of dyestuffs and oil additives.

---

This application is a continuation-in-part of application Ser. No. 205,503, filed June 27, 1962, and of application Ser. No. 359,763 filed Apr. 14, 1964, which latter application is a continuation-in-part of application Ser. No. 205,512, filed June 27, 1962, now abandoned.

The present invention is directed to thioesters and in particular is directed to novel thioethers corresponding to the formula

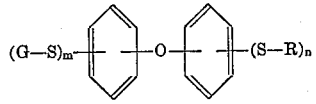

In the present specification and claims, R represents a member of the group consisting of alkyl containing from 2 to 12, inclusive, carbon atoms, cycloalkyl, phenyl, substituted phenyl whereof the substituents are selected from nitro, lower alkyl, and phenoxy; G is independently of the same scope as R, the subscript $n$ represents an integer from 1 to 4, and the subscript $m$ represents an integer from 0 to 4; and when $m$ is zero and R is phenyl it is substituted phenyl of which the substituents are nitro or phenoxy.

Thus the present compounds are either, when $m$ represents 0, of the first sub type

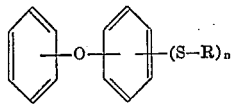

or, when $m$ represents 1 or more, of the second sub type which can be represented as equivalent to

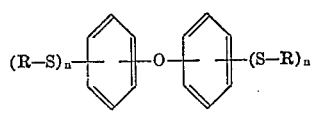

wherein R and $n$ have the values previously set forth.

The novel compounds are colorless to yellow crystalline solids or oils. They are slightly soluble in water but readily soluble in various common organic solvents such as lower alkanols, benzene and the like. The compounds are useful as insecticides, molluscacides, and herbicides; as inhibitors of the germination of fungus spores, they are effective fungistats. The compounds are also useful as additives to improve the properties of lubricating oils especially designed for operation under high pressures and temperatures; they are useful as intermediates in the preparation of dyestuffs and biologically active materials; they are also of value as solvent additives in the modification of behavior of mixed solvent systems. They are useful as inhibitors of the germination of seeds of the Brassicacea. Various of the compounds are coccidiostats.

The compounds are prepared by a process which comprises the steps of causing a reaction between a molecular proportion of an aromatic ether halide compound corresponding to the formula

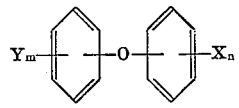

and $m$ molecular proportions of a first mercaptan corresponding to the formula

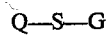

and $n$ molecular proportions of a second mercaptan corresponding to the formula

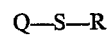

wherein X and Y are halogens, Y being of greater molecular weight than X, when R and G are not identical; R, G, $m$, and $n$, have the values previously stated, and Q represents hydrogen, alkali metal, or cuprous copper. During the reaction to prepare the present compounds, $m$ molecules of first type mercaptan react first at the site or sites of the halogen Y, and thereafter $n$ molecules of the second type mercaptan react at the site or sites of the halogen X, with each molecule of aromatic halide. Small amounts of mercaptan may be lost in side reactions. Thus, when it is desired to prepare the present compound in a high state of purity and with a minimum of necessary postsynthesis purification procedure, the starting reactants should be employed in equimolecular proportions, or preferably, with any mercaptan in slight excess. However, other proportions may be employed if desired, and unconsumed starting material of whatever identity may, if desired, be recycled into further synthesis process.

The reaction goes forward at temperatures over a wide range, such as from 30° to 350° C., but initiates most readily when heated to a temperature somewhat higher than room temperature. A preferred temperature range is from 80 to 230° C. Under these conditions the reaction is, in general, exothermic and goes forward to completion with good yield calculated upon the basis of consumed starting material. When Q is hydrogen, hydrogen halide of reaction is evolved and means for its orderly disposal are advantageously provided.

Typically, in the preparation of the compounds of the present invention, reaction between the mercaptan starting material and the aromatic ether halide starting material will initiate and go forward only when there is employed, a catalytic amount of both a source of cuprous ion and of a nitrogenous base. Thus, in the preparation of many, and probably all of the present compounds, the employment of such catalyst is essential and critical, although the exact weight is not critical. Certainly the employment of such catalyst is in all cases highly advantageous. The source of cuprous ion may be metallic copper, in which case the copper reacts in some way to obtain cuprous halide. Also, cuprous oxide may be employed as a source of cuprous ion in which case water of reaction is evolved and cuprous halide results. Cuprous chloride itself or other cuprous salt may be employed. The employed weight is not critical, but may vary from a very small trace amount, less than 1/100 of 1 molar percent, to as much as an amount equimolecular with either reactant or even greater. In general, the employment of larger amounts is accompanied by no major advantage and, being expensive, is not preferred.

The nitrogeneous base may be ammonia, a primary, secondary, or tertiary aliphatic or aromatic amine or a nitrogenous heterocycle wherein the nitrogen acts, or is capable of acting, as a basic substance. If desired, the nitrogenous base may be a naturally liquid substance which is employed as a reaction medium. Otherwise, such base is dissolved in inert liquid reaction medium such as an aromatic or aliphtic hydrocarbon oil.

It is preferred, in at least laboratory quantities, to employ the nitrogeneous base catalyst substance in sufficient excess that portions of it may also act as hydrogen halide acceptor and yet further portions may continue to function, unreacted, in the necessary catalytic manner.

In carrying out the reaction to prepare the compounds of the present invention, the aromatic halide and the first mercaptan, when $m$ is greater than zero are intimately mixed and blended, in any order and in desired amounts, with source of cuprous ion and nitrogeneous base as hereinbefore described, preferably in liquid reaction medium which may be inert reaction medium or preferably nitrogenous base catalytic reaction medium and thereafter heated, to a temperature at which reaction takes place promptly. In one convenient method of practicing the present method, the reaction temperature may be the reflux temperature of the liquid reaction medium. In this situation, heating may be continued at the boiling temperature of the reaction mixture and under reflux for a period of time to carry the first step reaction to completion. When second mercaptan unlike the first is employed, it is then added to the mixture resulting from first step reaction, and essentially the same procedures are repeated.

Upon completion of the reaction, the desired compounds of the present invention are separated in manners which, in view of the teaching of the instant specification, will be evident to skilled chemists. In one such manner, the reaction mixture, hot from heating to the reaction temperature, is poured into a mixture of ice and concentrated hydrochloric acid whereupon a precipitate forms from which the desired product can be extracted as a solvent-soluble fraction. Representative extraction solvents include diethyl ether, chlorinated hydrocarbons, and benzene. In any event the reaction product is extracted with solvent, the solvent extract dried over an inert drying agent such as, for example, anhydrous potassium sulfate or the like; the solvent vaporized and removed and the remaining product chilled or otherwise induced to crystallize and, if desired, recrystallized from a solvent such as a lower alkanol.

When production of the present compounds is to be carried out on an industrial scale, various other methods of separation and purification may be preferred, including, for example, centrifugation, decantation, vacuum distillation, and the like.

The following examples, without more, will enable those skilled in the art to practice the present invention.

Example 1.—Phenyl p-(hexylthio)phenyl ether

In the instant example, having reference to the generic formula of the present compounds, $m$ becomes zero, $n$ becomes 1, and R is normal hexyl.

A reaction mixture is prepared, consisting of 373.6 grams (1.5 moles) of p-bromophenyl phenyl ether, 30 grams of cuprous bromide, and 265 grams (approximately 2.3 moles) of sodium n-hexylmercaptide dispersed in one liter technical grade 2,4-lutidine. The resulting reaction mixture is placed in a flask under reflux. In this situation, the reaction mixture is heated at its reflux temperature (a pot temperature between approximately 150° and 175° C.) for 30 hours, with stirring, to carry the reaction to completion. At the end of this reaction period, the resulting hot mixture is poured into a mixture of shaved ice and excess concentrated hydrochloric acid. As a result of these procedures, the ice melts and basic substances react with hydrochloric acid; in the resulting acidified water a precipitate forms. The precipitate is collected by filtration and is extracted with ether, the ether extract liquid being saved. This liquid is dried over a bed of anhydrous potassium carbonate which also neutralizes remaining traces of acidic substances; the resulting liquid is warmed to vaporize and remove ether solvent and obtain a residual oil. This oil is fractionally distilled at gradually rising temperatures and declining subatmospheric pressure, to obtain a colorless, oily phenyl p-(n-hexylthio)phenyl ether product of molecular weight approximately 285, as determined by mass spectrum analysis.

The compound of the present example is useful as an insecticide for the control of domestic insects. The application of 500 parts of the said compound as sole toxicant, per million parts of resulting aqueous dispersion to water continuing a heavy population of aquatic larvae of mosquitos results in a complete kill of the insect larvae.

Example II.—Bis((p-phenylthio)phenyl)ether

In this example, $m$ is unity, G is phenyl, $n$ is unity, and R is phenyl, in the generic formula

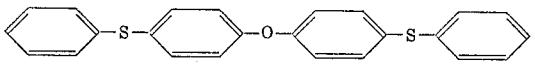

In procedures essentially similar to the foregoing except that the starting mercaptan is employed in an amount approximately twice equimolecular with the haloaromatic compound, and the haloaromatic compound is bis(p-bromophenyl) ether, there is prepared, in good yield, bis((p-phenylthio)phenyl) ether as white crystalline plates readily soluble in 95 percent ethanol and of extremely low solubility in water, melting at 92–93° C. The compound has insecticidal properties.

Essentially the same results are obtained when starting with the bis(p-chlorophenyl) ether: reaction times are somewhat longer for complete reaction.

Example III.—Bis(m-phenoxyphenyl)sulfide

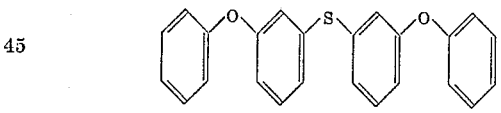

In the generic formula of the present invention, as here applied, $m$ is zero, $n$ is unity, R is substituted phenyl of which the substituent is phenoxy.

In procedures essentially similar to the foregoing, there is caused a reaction between m-bromophenyl phenyl ether and m-phenoxybenzenethiol there is obtained a bis(m-phenoxyphenyl)sulfide product as a yellow oil boiling at 231–235° C. under 0.3 millimeter mercury pressure, absolute. The compound has a refractive index $n/D$ of 1.6490 for the D line of sodium light at 25° C. It is highly selectively toxic to Limnaiud snails (for example Planorbis spp.) which are alternate hosts of various human and animal parasites such as liver flukes and schistosomiasis. At heavier rates the compound is a herbicide.

Example IV.—3-(cyclohexylthio)-(5-cyclopentylthio) phenyl 3,5-bis(dodecylthio) phenyl ether In the instant example, under the generic formula, each of $m$ and $n$ is two; one embodiment of G is cyclohexyl and one is cyclopentyl; each embodiment of R is dodecyl.

The present synthesis takes advantage of the fact that the reactivity of a halogen substituent upon an aromatic nucleus in the preparation of the present products, follows the order of the molecular weight. Because of this, a compound of the present invention may have more than one kind of radical represented by either of G and R in the generic disclosure hereinbefore.

In a mixture of 250 milliliters technical 2,4-lutidine, 150 milliliters quinoline and 20 grams cuprous oxide as mixed liquid reaction medium, is dispersed 46.5 grams (0.1 mole) 3-bromo-5-chlorophenyl 3,5-diiodophenyl ether and 40.4 grams (0.2 mole) of dodecyl mercaptan. The resulting reaction mixture is heated, with stirring at its boiling temperature and under water-trapped reflux for 2 hours. Thereafter, there is added 10.2 grams (0.1 mole) of cyclopentane thiol, as heating and stirring are continued for 2 hours further. At the conclusion of the reaction time, there is added 11.6 grams (0.1 mole) cyclohexanethiol and reaction conditions are maintained for two hours further. Thereafter, the resulting hot mixture is poured directly into a mixture of chipped ice and 500 milliliters concentrated hydrochloric acid. As a result of these procedures, the ice melts and a solid separates in the resulting aqueous dispersion. This solid is collected by filtration and an acetone extract made of it. The acetone extract is washed twice with hydrochloric acid and then dried over anhydrous potassium carbonate. From the resulting dry acetone solution, acetone solvent is evaporated, leaving an off-white product solid which is recrystallized from chloroform to obtain off-white crystals of 3-(cyclohexylthio)-(5-cyclopentylthio)phenyl 3,5-bis-(dodecylthio)phenyl ether having the structure formula

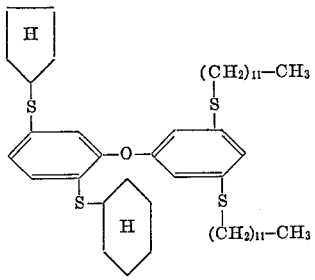

and having molecular weight of 769.4.

By employing the different reactivities of the different halogen substituents upon aromatic nuclei, and by using therewith predetermined molar amounts of reactants, it is possible to direct a predetermined mercaptan of thiol substituent to any predetermined ring carbon atom of the diphenyl ether nucleus. It is desired to use any mercaptan reactant in an amount slightly less than that stoichiometric with the halogenated site of sites upon which it is desired to attach a -thio radical.

Example V.—o-(Cyclopentylthio)phenyl phenyl ether

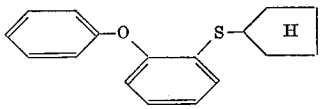

Applying the generic formula to the persent example, $m$ becomes zero, $n$ is unity and R is cyclopentyl.

A reaction mixture is prepared consisting essentially of 24.2 grams (0.1 mole) of o-bromophenyl phenyl ether, 10.2 grams (0.1 mole) of cyclopentane thiol, and 10 grams cuprous bromide dispersed together in 200 milliliters mixed technical xylidines as hydrogen halide acceptor, catalyst, and liquid reaction medium. The resulting reaction mixture is heated for approximately 3 hours at its boiling temperature and under reflux and with stirring, to carry the reaction to completion. At the conclusion of the reaction time, the resulting hot mixture is poured directly into a mixture of chipped ice together with 250 milliliters concentrated hydrochloric acid. As a result of these procedures, the ice melts and a dark solid separates in the resulting aqueous dispersion. This solid is collected by filtration and a benzene extract thereof prepared; the extract is washed twice with 10 percent hydrochloric acid and dried over potassium carbonate. From the resulting dry benzene solution, benzene solvent is heated and vaporized to obtain a colorless oil which is redistilled to obtain an oily o-(cyclopentylthio)phenyl ether which is liquid at room temperature and has a molecular weight of approximately 270.4. In the pure form, the product boils at 141° C. under pressure of 0.2–0.3 millimeters mercury absolute, and has a refractive index $n/D$ of 1.6062 at 20° C.

In procedures essentially the same as the foregoing, by the use of appropriate starting materials, other products of the present invention are prepared as follows:

From m-iodophenyl phenyl ether and m-nitrobenzenethilol, a m-(m-nitrophenylthio)phenyl phenyl ether product.

Example VI.—o-(Hexylthio)phenyl phenyl ether

Under the generic formula, in this example, $m$ becomes zero, $n$ becomes 1, and R is hexyl.

In procedures essentially similar to the foregoing except that o-bromophenyl phenyl ether is employed in the reaction mixture instead of the p-analogue, there is prepared, in good yield, o-(hexylthio)phenyl phenyl ether as white crystals readily soluble in various common organic solvents. Elemental analysis and infrared spectrum confirm the assigned structure.

In procedures essentially the same as the foregoing, by the use of appropriate starting materials, other products of the present invention are prepared as follows:

From p-bromophenyl phenyl ether and sodium t.-butylmercaptide, a p-(t.-butylthio)phenyl phenyl ether product as white crystals. Its biological properties are closely similar to those foregoing.

Also, employ the sodium salt of n-butylmercaptan in procedures otherwise like the foregoing, there is obtained a p-(butylthio)phenyl phenyl ether product.

From o-chlorophenyl phenyl ether and sodium ethyl mercaptide, an o-(ethylthio)phenyl phenyl ether product as off-white crystals melting at 53°–53.5° C. This product is ascaricidal, herbicidal, and useful for the control of certain molluso vectors of Schistosomiasis.

Under the generic formula, $m$ is zero, $n$ is unity, and R is ethyl.

From p-iodophenyl phenyl ether and sodium ethyl mercaptide, a p-(ethylthio)phenyl phenyl ether product as a colorless oil having a refractive index $n/D$ at 25° C. of 1.6027 and boiling at 115–118° C., under pressure of 0.1 millimeter mercury absolute. This product has selective herbicidal properties.

The general formula applies alike to the foregoing and to the present preparation; the site of the group $(S-R)_n$ differs.

From m-bromophenyl phenyl ether and sodium ethyl mercaptide, a colorless, oily m-(ethylthio)phenyl phenyl ether having a refractive index $n/D$ of 1.6002 at 25° C., and boiling at 124°–126° C. under pressure of 0.8 millimeter mercury, absolute. The compound is coccidiostatic, and is an effective herbicide.

The generic formula is applied to the present embodiment of the invention as to the foregoing.

From p-bromophenyl phenyl ether and isopropylmercaptan, a colorless, oily p-(isopropylthio)phenyl phenyl ether product boiling at 130°–136° C. under pressure of 0.4–0.5 millimeter mercury, absolute, and having a refractive index $n/D$ of 1.5873 at 25° C. The compounds harmlessly rid mice of tapeworms and trichostrongylid worms; it is a molluscacide and at 1 part per million in water kills all of a heavy population of Daphnia (water fleas). It is also herbicidal.

In the present embodiment, $m$ is zero, $n$ is unity, and R isopropyl in the generic formula.

Despite the adverse experience reported by Brewster and Stevenson (Journal of the American Chemical Society, Volume 62, pages 3144–3146) good results have been obtained by the direct halogenation of diphenyl ether in the absence of catalyst and solvent, in preparation of various of the halogenated diphenyl ethers used as starting materials herein. The isomeric preferences mentioned by Brewster and Stevenson appear to be shown by the products of such halogenation and resolution into pure products of the resulting sometimes isomeric mixtures has not been difficult.

The authority cited, supra, shows various methods of preparation and contains references to other.

When it is desired to prepare a pure halogenated diphenyl ether compound of a precise isomeric structure, the method of Ullman and Sponagel is available and by the employment of the appropriately substituted phenols and benzenes leads easily to the desired halogenated diphenyl ethers. The method is set forth in Liebig's Annallen der Chemie, Band 350, pages 83–107. The method has been extended beyond even their original scope by numerous authorities.

The necessary mercaptans and thiols are either articles of commerce or are readily prepared in such known methods as are used in routine production, by the employment of suitable starting materials. Such methods are set forth in Volume 1 of "Organic Chemistry of Bivalent Sulfur" (Chemical Publishing Company, New York, 1958) by Reid.

I claim:
1. Compound corresponding to the formula

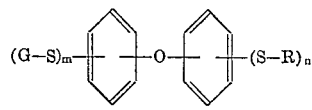

wherein R represents a member of the group consisting of alkyl containing from 2 to 12, inclusive, carbon atoms, and cyclopentyl, cyclohexyl; and G is independently of the same scope as R, the subscript $n$ represents an integer from 1 to 4, and the subscript $m$ represents an integer from 0 to 4.

2. Bis(m-phenoxyphenyl)sulfide.
3. 3-(cyclohexylthio) - (5 - cyclopentylthio)phenyl 3,5-bis(dodecylthio)phenyl ether.
4. o-(Cyclopentylthio)phenyl phenyl ether.
5. o-(Ethylthio)phenyl phenyl ether.
6. p-(Ethylthio)phenyl phenyl ether.
7. M(Ethylthio)phenyl phenyl ether.
8. p-(Isopropylthio)phenyl phenyl ether.
9. p-(n-Hexylthio)phenyl phenyl ether.

References Cited

Marziano et al., La Riceria Scientifica, 31 II–A., pp. 88–89 (1961).

Arcoria et al., Gazz. Chim. Ital., vol. 91, pp. 228–229.

Arcoria et al., La Riceria Scientifica, 28, No. 9, pp. 1842–46 (1958).

Blake et al., High Temperature Hydrolic Acids, Defense Documentation Center for Scientific and Technical Information, WADC Technical Report 54–532, Part III, Astia Document No. AD118170, p. 10 (April 1957).

CHARLES B. PARKER, *Primary Examiner.*

D. R. PHILLIPS, *Assistant Examiner.*